United States Patent
Krishnan et al.

(10) Patent No.: US 12,493,734 B1
(45) Date of Patent: Dec. 9, 2025

(54) SYSTEMS AND METHODS FOR OPTIMIZING MIXTURE-OF-EXPERTS MODEL PLACEMENT USING QUBO-BASED BIN PACKING

(71) Applicant: QpiAI India Private Limited, Nagavara (IN)

(72) Inventors: Aswanth Krishnan, Bengaluru (IN); Sachin Kumar, Bengaluru (IN); Lakshya Priyadarshi, Lucknow (IN); Nagendra Nagaraja, Bangalore (IN)

(73) Assignee: QpiAI India Private Limited, Bangalore (IN)

( * ) Notice: Subject to any disclaimer, the term of this patent is extended or adjusted under 35 U.S.C. 154(b) by 0 days.

(21) Appl. No.: 19/311,808

(22) Filed: Aug. 27, 2025

(51) Int. Cl.
*G06F 30/392* (2020.01)
*G06N 3/063* (2023.01)

(52) U.S. Cl.
CPC .......... *G06F 30/392* (2020.01); *G06N 3/063* (2013.01)

(58) Field of Classification Search
CPC .............................. G06F 30/392; G06N 3/063
See application file for complete search history.

(56) References Cited

U.S. PATENT DOCUMENTS 12,387,130 B1 * 8/2025 Alam ...................... G06N 7/01
2022/0004815 A1 * 1/2022 Matsumoto ............. H04L 9/085

* cited by examiner

*Primary Examiner* — Nghia M Doan
(74) *Attorney, Agent, or Firm* — Foley & Lardner LLP

(57) ABSTRACT

Systems and methods for optimizing the placement of experts in a mixture-of-experts (MoE) model are disclosed. A system can include one or more processors coupled to non-transitory memory. The system can obtain a set of attributes of a plurality of hardware components of a distributed computing environment. The system can determine a set of co-activation metrics for a plurality of experts of a mixture-of-experts model according to inference or training operations executed using the mixture-of-experts model. The system can generate a quadratic unconstrained binary optimization (QUBO) data structure based at least on the set of attributes and the set of co-activation metrics. The system can assign the plurality of experts of the mixture-of-experts model to the plurality of hardware components of the distributed computing environment according to the QUBO data structure. The system can execute the mixture-of-experts model using the plurality of hardware components according to the assignment.

20 Claims, 5 Drawing Sheets

SYSTEMS AND METHODS FOR OPTIMIZING MIXTURE-OF-EXPERTS MODEL PLACEMENT USING QUBO-BASED BIN PACKING

BACKGROUND

Mixture-of-Experts (MoE) models can be deployed in distributed computing environments to support large-scale machine learning applications. Deploying such models may involve distributing individual expert components across heterogeneous hardware resources with varying memory, bandwidth, and processing characteristics. However, effectively allocating and managing expert workloads in such distributed environments is challenging.

SUMMARY

Distributed computing environments can support the deployment of large-scale machine learning models, such as Mixture-of-Experts (MoE) models, across multiple heterogeneous hardware resources. Conventional approaches for allocating experts within such models to available hardware resources often use static or greedy partitioning strategies, which can disregard the patterns of expert co-activation and the heterogeneity of the underlying hardware. In some implementations, existing methods can assign experts evenly or based on immediate resource availability, without considering communication costs or dynamic changes in workload characteristics. As the number of experts and hardware devices increases, such approaches can result in communication bottlenecks, inefficient bandwidth usage, increased latency, and imbalanced utilization of resources.

The techniques described herein address expert placement of MoE models by formulating the allocation problem as a quadratic unconstrained binary optimization (QUBO) problem representing an N-dimensional bin packing scenario. In the QUBO bin-packing problem, processing components can be represented as arbitrary bin volumes, experts as boxes, resource utilization efficiency as occupation metrics, and communication costs as overlap penalties. The allocation strategies described herein can significantly improve the performance of MoE models when executed in distributed computing environments. In some cases, distributed computing environments that were previously unable to execute MoE models due to resource constraints resulting from naive or greedy allocation can be used to execute MoE models deployed according to the approaches described herein.

At least one aspect relates to a system. The system can include one or more processors coupled to non-transitory memory. The system can obtain a set of attributes of a plurality of hardware components of a distributed computing environment. The system can determine a set of co-activation metrics for a plurality of experts of a mixture-of-experts model according to inference or training operations executed using the mixture-of-experts model. The system can generate a quadratic unconstrained binary optimization (QUBO) data structure based at least on the set of attributes and the set of co-activation metrics. The system can assign the plurality of experts of the mixture-of-experts model to the plurality of hardware components of the distributed computing environment according to the QUBO data structure. The system can execute the mixture-of-experts model using the plurality of hardware components according to the assignment.

In some implementations, the set of attributes of the plurality of hardware components comprises at least one of an amount of memory, a memory bandwidth, a processing capability, or a number of processing circuits. In some implementations, the system can determine the set of co-activation metrics for the plurality of experts by causing the mixture-of-experts model to process a predetermined dataset. In some implementations, the system can generate a set of assignments for the plurality of experts by solving a cost function generated using the QUBO data structure. In some implementations, the system can select an optimization function from a plurality of optimization functions applicable to the cost function. In some implementations, the system can generate the set of assignments by applying the optimization function to the cost function. In some implementations, the system can generate a second set of co-activation metrics based on execution of the plurality of experts assigned to the plurality of hardware components.

In some implementations, the system can determine, based on the second set of co-activation metrics, that the plurality of experts are to be re-assigned among the plurality of hardware components. In some implementations, the system can generate a second QUBO data structure according to the second set of co-activation metrics in response to determining that the plurality of experts are to be re-assigned. In some implementations, the system can receive a request to deploy the mixture-of-experts model in the distributed computing environment. In some implementations, the system can identify the plurality of hardware components based on the request. In some implementations, the system can update the set of co-activation metrics according to at least one threshold. In some implementations, the system can generate the QUBO data structure further based on a number of parameters in each expert of the plurality of experts. In some implementations, a subset of the plurality of experts can include replica networks. In some implementations, the system can generate the QUBO data structure further based on at least one penalty term for placement of the subset of the plurality of experts among the plurality of hardware components.

At least one other aspect relates to a method. The method can be performed, for example, by one or more processors coupled to non-transitory memory. The method can include obtaining a set of attributes of a plurality of hardware components of a distributed computing environment. The method can include determining a set of co-activation metrics for a plurality of experts of a mixture-of-experts model according to inference or training operations executed using the mixture-of-experts model. The method can include generating a quadratic unconstrained binary optimization (QUBO) data structure based at least on the set of attributes and the set of co-activation metrics. The method can include assigning the plurality of experts of the mixture-of-experts model to the plurality of hardware components of the distributed computing environment according to the QUBO data structure. The method can include executing the mixture-of-experts model using the plurality of hardware components according to the assignment.

In some implementations, the set of attributes of the plurality of hardware components comprises at least one of an amount of memory, a memory bandwidth, a processing capability, or a number of processing circuits. In some implementations, the method can include determining the set of co-activation metrics for the plurality of experts by causing the mixture-of-experts model to process a predetermined dataset. In some implementations, the method can include generating a set of assignments for the plurality of experts by solving a cost function generated using the QUBO data structure. In some implementations, the method can include selecting an optimization function from a plurality of optimization functions applicable to the cost function. In some implementations, the method can include generating the set of assignments by applying the optimization function to the cost function. In some implementations, the method can include generating a second set of co-activation metrics based on execution of the plurality of experts assigned to the plurality of hardware components.

In some implementations, the method can include determining, based on the second set of co-activation metrics, that the plurality of experts are to be re-assigned among the plurality of hardware components. In some implementations, the method can include generating a second QUBO data structure according to the second set of co-activation metrics in response to determining that the plurality of experts are to be re-assigned. In some implementations, the method can include receiving a request to deploy the mixture-of-experts model in the distributed computing environment. In some implementations, the method can include identifying the plurality of hardware components based on the request. In some implementations, the method can include updating the set of co-activation metrics according to at least one threshold. In some implementations, the method can include generating the QUBO data structure further based on a number of parameters in each expert of the plurality of experts. In some implementations, wherein a subset of the plurality of experts comprise replica networks. In some implementations, the method can include generating the QUBO data structure further based on at least one penalty term for placement of the subset of the plurality of experts among the plurality of hardware components.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. Aspects can be combined, and it will be readily appreciated that features described in the context of one aspect of the invention can be combined with other aspects. Aspects can be implemented in any convenient form, for example, by appropriate computer programs, which may be carried on appropriate carrier media (computer readable media), which may be tangible carrier media (e.g., disks) or intangible carrier media (e.g., communications signals). Aspects may also be implemented using any suitable apparatus, which may take the form of programmable computers running computer programs arranged to implement the aspect. As used in the specification and in the claims, the singular form of 'a,' 'an,' and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
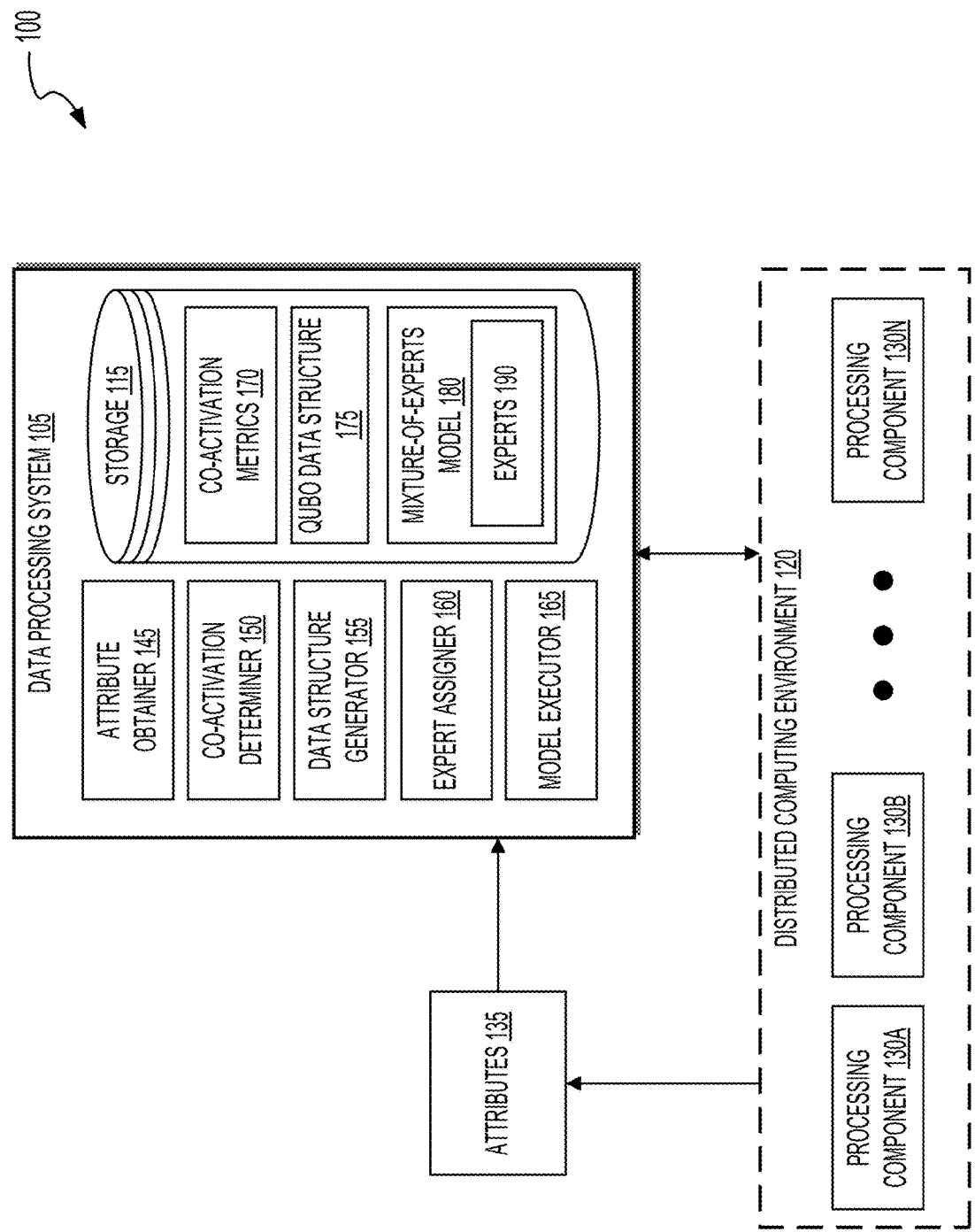
FIG. 1 is a block diagram illustrating an example system for optimizing placement of experts in a mixture-of-experts model using quadratic unconstrained binary optimization (QUBO)-based bin packing in a distributed computing environment, in accordance with one or more implementations.

Below are detailed descriptions of various concepts related to, and approaches, methods, apparatuses, and systems for implementing the various techniques described herein. The various concepts introduced above and discussed in greater detail below may be implemented in any of numerous ways, as the described concepts are not limited to any particular manner of implementation. Examples of specific implementations and applications are provided primarily for illustrative purposes.

This disclosure relates to techniques for optimizing the placement of Mixture-of-Experts (MoE) models in distributed computing environments. MoE models can be used in a variety of machine learning applications, including large language models and other neural network-based systems. In distributed computing environments, such as clusters of Graphics Processing Units (GPUs) or heterogeneous hardware resources, MoE models can be deployed such that computational workloads are distributed across multiple devices. The deployment of MoE models can involve assigning individual neural network submodules, referred to as experts, to available hardware resources. Distributed computing environments can include a range of hardware types, each having different memory, bandwidth, and processing characteristics.

Conventional approaches to deploying MoE models in distributed computing environments involves assigning experts to hardware resources using static partitioning, greedy heuristics, and/or manual mapping. Such approaches disregard patterns of expert co-activation, hardware heterogeneity, and changes in workload characteristics, resulting in significantly degraded performance. As the number of experts and hardware devices increases, conventional techniques can result in significant communication bottlenecks, inefficient use of bandwidth, increased latency, and imbalanced resource utilization. Static or non-adaptive allocation strategies fail to respond to changing inference workloads or changes in model usage. Moreover, in scenarios where replicas of experts are deployed for fault tolerance, existing solutions fail to distribute replicas such that high availability is maintained.

The techniques described herein can address the allocation of MoE model experts by formulating the placement problem as a quadratic unconstrained binary optimization (QUBO) problem. The techniques described herein can represent the assignment of experts to hardware resources as an N-dimensional bin packing scenario, where each expert can be treated as an item and each hardware resource can be treated as a bin. The cost function of the QUBO problem can encode placement constraints, communication costs based on co-activation probabilities, load balancing objectives, and hardware limitations. Co-activation patterns, hardware telemetry, and network topology information can be incorporated as terms into the optimization process.

To implement these techniques, expert activation patterns, collect resource attributes, and model co-activation statistics from production traffic can be obtained or derived by monitoring execution of a MoE model in a distributed computing system. A QUBO data structure that encodes the placement problem can be generated. A solver can process the QUBO data structure to generate an assignment of experts to hardware resources. Hierarchical decomposition and/or sparsification may be used to reduce computational complexity for certain MoE models, such as those having a large number of parameters or experts. The MoE model can be deployed and executed according to the resulting assignments. Re-optimization may be performed automatically under various conditions, such as changes in co-activation metrics or changes in availability of computing resources.

By implementing the techniques described herein, the allocation of MoE model experts can be aligned with actual workload patterns and hardware characteristics. The techniques described herein can reduce communication overhead by co-locating frequently co-activated experts, balance resource utilization across heterogeneous hardware, and adapt to changes in workload or resource state. The techniques described herein can support large-scale deployments, improve throughput and latency, and provide mechanisms for fault-tolerant replica placement. As a result, the techniques described herein can provide technical improvements over existing approaches to MoE model deployment in distributed computing environments.

Referring now to FIG. 1, illustrated is a block diagram of an example system 100 for optimizing placement of experts in a MoE model using QUBO-based bin packing in a distributed computing environment, in accordance with one or more implementations. The system 100 can include at least one data processing system 105 and at least one distributed computing environment 120. The distributed computing environment 120 can include one or more processing components 130A-130N (sometimes referred to generally as the "processing component(s) 130"). The data processing system 105 can include at least one attribute obtainer 145, at least one co-activation determiner 150, at least one data structure generator 155, at least one expert assigner 160, at least one model executor 165, and at least one storage 115. The storage 115 can include one or more co-activation metrics 170, one or more QUBO data structures 175, and at least one mixture-of-experts model 180, which can include multiple experts 190. The system 100 can further include one or more attributes 135.

The data processing system 105 can include one or more processors coupled to non-transitory memory (e.g., a processing circuit). The data processing system 105 can include, for example, one or more central processing units (CPUs), graphics processing units (GPUs), tensor processing units (TPUs), neural processing units (NPUs), application-specific integrated circuits (ASICs), and/or field-programmable gate arrays (FPGAs), among others, that can be used to perform any of the operations described herein. In some implementations, the data processing system 105 can include a quantum computing system. The quantum computing system can be used, for example, to solve QUBO problems using quantum annealing and/or gate-based quantum functions, as described in further detail herein. For example, the data processing system 105 can include a combination of classical processors (e.g., CPUs, GPUs, etc.) and quantum processors (QPUs).

In brief overview of various operations described herein, the data processing system 105 can be used to automatically assign the experts 190 of one or more MoE models 180 to the processing components 130A-130N of the distributed computing environment 120. The data processing system 105 can obtain a set of attributes 135 of each processing component 130A-130N in the distributed computing environment 120. The data processing system 105 can determine co-activation metrics 170 for the experts 190 of the MoE model 180 based on inference or training operations executed using the MoE model 180 within the distributed computing environment 120 or another environment in which the MoE model 180 was previously deployed. The data processing system 105 can generate a QUBO data structure 175 using the attributes 135 of each processing component 130A-130N and the co-activation metrics 170. The data processing system 105 can assign the experts 190 of the MoE model 180 to one or more of the processing components 130 in the distributed computing environment 120 according to a solution to the QUBO data structure 175. The data processing system 105 can execute the MoE model 180 using the assigned processing components 130. In some implementations, the data processing system 105 can monitor resource utilization, update the co-activation metrics 170 in response to workload changes, and/or trigger re-optimization/re-assignment processes when drift from expected expert 190 co-activation is detected.

The data processing system 105 can be included as part of the distributed computing environment 120. In some implementations, the data processing system 105 can be external to the distributed computing environment 120 and can interact with the distributed computing environment 120 over a network connection. In some implementations, the data processing system 105 can be implemented as a cloud-based service, a dedicated orchestration node, or a remote management appliance. The data processing system 105 can communicate with processing components 130 using standard network protocols, remote procedure calls, or message-passing interfaces. For example, the data processing system 105 can use any type of suitable networking protocol, such as Transmission Control Protocol/Internet Protocol (TCP/IP), Remote Direct Memory Access (RDMA), or InfiniBand protocols, to exchange data with the distributed computing environment 120 and/or the processing components 130 thereof.

In some implementations, the data processing system 105 can establish secure communication channels with the distributed computing environment 120 and/or the processing components 130 thereof using Transport Layer Security (TLS) or Secure Sockets Layer (SSL) protocols to transmit configuration data, telemetry, or control messages between the data processing system 105 and the distributed computing environment 120. Various application programming interfaces (APIs) may be used to perform such communications. For example, the data processing system 105 can use representational state transfer (REST) application programming interfaces (APIs), gRPC, or message queueing protocols such as Advanced Message Queuing Protocol (AMQP) or Message Queuing Telemetry Transport (MQTT) to transmit commands and/or receive status updates from the processing components 130.

In some implementations, the data processing system 105 can periodically poll the processing components 130 for resource status and/or can receive asynchronous event notifications from nodes/clusters/processing components 130 of the distributed computing environment 120 indicating changes in resource state, workload, and/or connectivity. In some implementations, the data processing system 105 can access service discovery records or registries to identify available processing components 130 within the distributed computing environment 120. In some implementations, the data processing system 105 can use network address translation, load balancing, and/or software-defined networking operations to route communications between the data processing system 105 and the processing components 130.

The system 100 can include at least one distributed computing environment 120. The distributed computing environment 120 can include various heterogeneous hardware resources that are available for executing computing operations. The distributed computing environment 120 can include, for example, nodes/servers (which may include processing components 130), clusters, and/or other types of computing devices. In one example, the distributed computing environment 120 may be or may be included as part of a data center. The distributed computing environment 120 can include any type of computing hardware resources (e.g., processing components 130, etc.) with varying memory, bandwidth, processing capability, and network topology.

The distributed computing environment 120 may include one or more job executors and/or other components that are accessible to the data processing system 105 (e.g., via one or more suitable processing components) for the purpose of executing MoE models 180, monitoring telemetry data, attributes 135, or co-activation of experts 190 of one or more MoE models 180, among other operations. In some implementations, the distributed computing environment 120 can provision resources and enable communication among one or more processing components 130A-130N. In some implementations, the distributed computing environment 120 can execute multiple MoE models 180 and/or model replicas (e.g., replicas of experts 190, etc.), as described in further detail herein.

The distributed computing environment 120 can include any number of processing components 130A-130N to which experts 190 may be assigned. In some implementations, the distributed computing environment 120 (or any component or system thereof) can receive assignments of experts 190 from the data processing system 105 and automatically allocate hardware resources according to the assignments. In some implementations, the data processing system 105 can control the processing components 130 of the distributed computing environment 120 to allocate computing resources and deploy assigned experts 190 of one or more MoE models 180, as described in further detail herein.

In some implementations, the distributed computing environment 120 can include agents, controllers, or computing devices that can communicate with the data processing system 105, such that the data processing system 105 (or the components thereof) can monitor resource utilization, update assignments, and/or trigger re-assignment processes. In some implementations, the distributed computing environment 120 can include one or more interfaces that can allow orchestration or management operations to be performed by the data processing system 105. The interfaces can include application programming interfaces, command-line interfaces, or graphical user interfaces (e.g., provided via web-based interfaces, etc.), among others. Such interfaces can be used by the data processing system 105 to transmit configuration data, receive telemetry, initiate deployment commands, and/or monitor the state of the distributed computing environment 120 or the processing components 130 thereof.

The distributed computing environment 120 can include one or more processing components 130. The processing components 130 can be individual hardware resources within the distributed computing environment 120. Each of processing components 130 can include, for example, clusters, memory devices, CPUs, GPUs, FPGAs, ASICs, nodes/servers that include one or more GPUs/FPGAs/ASICs/CPUs, and/or other devices that can execute assigned experts 190 that form part of the MoE model 180. Each processing components 130A-130N can have one or more attributes 135, which may include memory size, bandwidth, processing capability, and/or other hardware characteristics described herein. The processing components 130 can be arranged in the distributed computing environment 120 such that each processing component 130 can communicate with other processing components 130 for execution of the MoE model 180.

For example, the processing components 130 can be interconnected using one or more network links or interconnects (e.g., Ethernet-based links, other high-bandwidth communication interfaces, etc.) that can provide bandwidth and latency characteristics suitable for distributed execution. The processing components 130 can exchange any type of data via such interfaces to perform any of the operations described herein. For example, the processing components 130 may communicate activation data, model parameters (e.g., experts 190, other parameters of a MoE model 180, etc.), or intermediate results during inference/training operations of the MoE model 180.

The processing components 130 and/or nodes/servers/clusters that include the processing components 130 can execute one or more agents that provides the attributes 135. In one example, a node or server of the including one or more of the processing components 130 that can execute the agent that provides the attributes 135. The agent can collect, generate, or transmit at least a portion of the attributes 135 associated with the processing components 130. In some implementations, the agent can periodically or continuously monitor the processing components 130 and update the attributes 135 via communications with the data processing system 105. For example, the agent(s) can transmit the attributes 135 to the data processing system 105 or one or more components thereof for use in the techniques described herein.

The attributes 135 of the processing components 130 of the distributed computing environment 120 can include a plurality of computational resource metrics, which can reflect the processing capabilities of the processing components 130 (e.g., nodes, servers, clusters, GPUs, CPUs, FPGAs, ASICs, etc.). The attributes 135 can specify a CPU compute capacity, which can be measured in floating point operations per second (FLOPS). The attributes 135 can include GPU compute capacity, which can be measured in tera floating point operations per second (TFLOPS). In some implementations, the attributes 135 can include metrics (e.g., TFLOPs, etc.) for accelerator compute resources, such as neural processing unit (NPU) or tensor processing unit (TPU) units.

In some implementations, the attributes 135 can specify quantization-specific hardware capabilities of one or more processing components 130, which can indicate support for reduced-precision arithmetic and/or other quantization modes implemented by certain machine learning operations (e.g., execution of quantized MoE models 180). The attributes 135 of the processing components 130 can include memory resource metrics, bandwidth resource metrics, and/or cache resource metrics. The attributes 135 can specify an available memory bandwidth of one or more processing components 130 (or components thereof). For example, the attributes 135 can include a peripheral component interconnect express (PCIe) bandwidth for CPU-GPU communication within a processing component 130, and/or an indication of an available network bandwidth of a processing component 130. The attributes 135 can include cache resource metrics, such as Level-1 (L1) and/or Level-2 (L2) cache availability, tensor core utilization, and/or register file usage.

The attributes 135 can include information specifying a topology of the distributed computing environment 120. The topology of the distributed computing environment 120 can be represented as a hierarchical structure that includes multiple levels (e.g., racks, pods, zones, regions, etc.). For example, the attributes 135 can specify that a particular processing component 130 is located within a specific rack, that the rack is part of a pod, that the pod is included in a zone, and that the zone is included in a region of the distributed computing environment 120. The attributes 135 can further specify bandwidth and latency characteristics associated with each level of the hierarchy, including but not limited to intra-rack bandwidth, inter-pod bandwidth, or inter-region latency. In some implementations, the attributes 135 can include identifiers for each processing component 130 that indicate the physical or logical grouping of the processing component 130 within the distributed computing environment 120.

The data processing system 105 is shown as including at least one storage 115. The storage 115 can store or maintain one or more data structures, which may contain, index, or otherwise store each of the values, pluralities, sets, variables, vectors, numbers, or thresholds described herein. The storage 115 can be accessed using one or more memory addresses, index values, or identifiers of any item, structure, or region maintained in the storage 115. In implementations where the storage 115 is external to the data processing system 105, the storage 115 can be accessed by the components of the data processing system 105 via the network 110 or via a local communications interface. The storage 115 can be distributed across many different computer systems or storage elements. The data processing system 105 can store, in one or more regions of the memory of the data processing system 105, or in the storage 115, the results of any or all computations, determinations, selections, identifications, generations, constructions, or calculations in one or more data structures indexed or identified with appropriate values.

The storage 115 can include one or more data structures that store the co-activation metrics 170. The co-activation metrics 170 can represent the frequency or probability with which pairs of experts 190 of an MoE model 180 are activated together during inference or training operations. In some implementations, the co-activation metrics 170 can be stored as a matrix indexed by expert pairs, where each entry in the matrix can indicate a probability or frequency value associated with the co-activation of a corresponding pair of experts 190. The storage 115 can maintain the co-activation metrics 170 such that the components of the data processing system 105 can access the co-activation metrics 170 for use in optimizing expert placement according to the techniques described herein. In some implementations, the co-activation metrics 170 can be constructed by analyzing telemetry logs of that capture which experts 190 are active for each input processed by the MoE model 180, as described in further detail herein.

The storage 115 can include one or more QUBO data structures 175. A QUBO data structure 175 can be a mathematical representation of expert 190 placement as a quadratic unconstrained binary optimization problem. In some implementations, the QUBO data structure 175 can be implemented as a Q matrix of the QUBO data structure 175 that encodes expert-to-resource assignment scenarios. The QUBO data structure 175 can include a set of binary decision variables, where each binary decision variable can represent an assignment of a particular expert 190 to a particular processing component 130. The QUBO data structure 175 can be or include a Q matrix, which can be structured such that each entry in the Q matrix corresponds to a linear or quadratic cost term associated with a particular assignment or pairwise assignment of experts 190 to processing components 130. The QUBO data structure 175 can be constructed using the attributes 135, from co-activation metrics 170, and from other cost terms described herein.

For example, in some implementations, the QUBO data structure 175 can encode constraints and cost terms for placement, communication, and resource limits. The QUBO data structure 175 can include diagonal entries that represent the cost of assigning an individual expert 190 to a particular processing component 130. The Q matrix of the QUBO data structure 175 can include off-diagonal entries that represent pairwise interaction costs, which may include the communication cost incurred when two frequently co-activated experts 190 are assigned to different processing components 130. The cost function represented by the QUBO data structure 175 can be quadratic, such that both individual assignments and pairwise interactions are captured. In some implementations, the QUBO data structure 175 can be used by a solver to determine an assignment of experts 190 to processing components 130 that minimizes the total cost subject to resource constraints, as described in further detail herein.

The storage 115 can include at least one MoE model 180. The MoE model 180 can be a machine learning model architecture that includes multiple experts 190. In some implementations, the MoE model 180 can include a large language model that uses routing to activate only a subset of experts 190 for each input. In some implementations, the MoE model 180 can include a multimodal model that processes text, images, audio, or other data types using distinct groups of experts 190. In some implementations, the MoE model 180 can be a sparse model, such that only a subset of the experts 190 are activated for each input. In some implementations, the MoE model 180 can be a non-sparse model, such that all or most of the experts 190 are activated for each input.

The MoE model 180 can be trained using supervised learning, unsupervised learning, reinforcement learning, or other machine learning techniques. In some implementations, the MoE model 180 can include quantized parameters, such that the parameters of the experts 190 or other components (e.g., gating networks, etc.) of the MoE model 180 are represented using reduced-precision formats. Non-limiting examples of such reduced-precision formats may include 8-bit integers, 4-bit floating point values, or other quantization formats. The MoE model 180 can be deployed and executed on distributed hardware resources, such as the processing components 130 of the distributed computing environment 120 according to the techniques described herein.

The experts 190 can be neural network components that are included within the MoE model 180. Each expert 190 can include one or more neural network layers, blocks, or submodules that are configured to process input data. In some implementations, the experts 190 can include feedforward neural networks, convolutional neural networks, recurrent neural networks, or other types of neural network architectures. The experts 190 can be configured to process distinct types of input data or to perform particular computations. The experts 190 can include parameters that are trained independently or jointly with other experts 190 of the MoE model 180. The experts 190 can receive input data routed by a gating network and can generate output data that can be combined with outputs from other experts 190. In some implementations, the experts 190 can include quantized parameters, such as parameters represented using reduced-precision formats. The experts 190 can be characterized by resource requirements that include memory usage, computational complexity, bandwidth usage, or cache requirements, among others.

Each expert 190 can be stored in association with a resource vector. Each item in the resource vector can correspond to a respective computational resource to implement or use the expert 190 of the MoE model 180. The resource vector can include one or more dimensions representing computational resources, memory resources, bandwidth resources, or cache resources. In some implementations, the computational resources dimensions of the resource vector can include one or more of a CPU compute requirement measured in FLOPS, a GPU compute requirement measured in TFLOPS, a specialized accelerator compute requirement (e.g., number of required NPUs or TPUs etc.), or a quantization-specific requirement (e.g., specifying a type of quantization, registers, instruction sets, etc.).

The memory resources dimensions of the resource vector can include one or more of a parameter memory requirement corresponding to model weights, an activation memory requirement corresponding to intermediate computations, a key-value (KV) cache memory requirement corresponding to attention mechanisms, or a high bandwidth memory (HBM) allocation requirement. The bandwidth resources dimensions of the resource vector can include one or more of a memory bandwidth requirement measured in gigabytes per second (GB/s), a PCIe bandwidth requirement for CPU-GPU communication, and/or a network bandwidth requirement for executing the expert 190 according to target performance metrics. The cache resources dimensions of the resource vector can include one or more of an L1 or L2 cache occupancy requirement, a tensor core utilization requirement, and/or a register file usage requirement. The resource vector stored in association with each expert 190 can be used to characterize the computational profile of the expert 190 for placement and optimization operations performed by the data processing system 105. An example representation of a sparse MoE model 180 is described in connection with FIG. 2.

Figure 2:
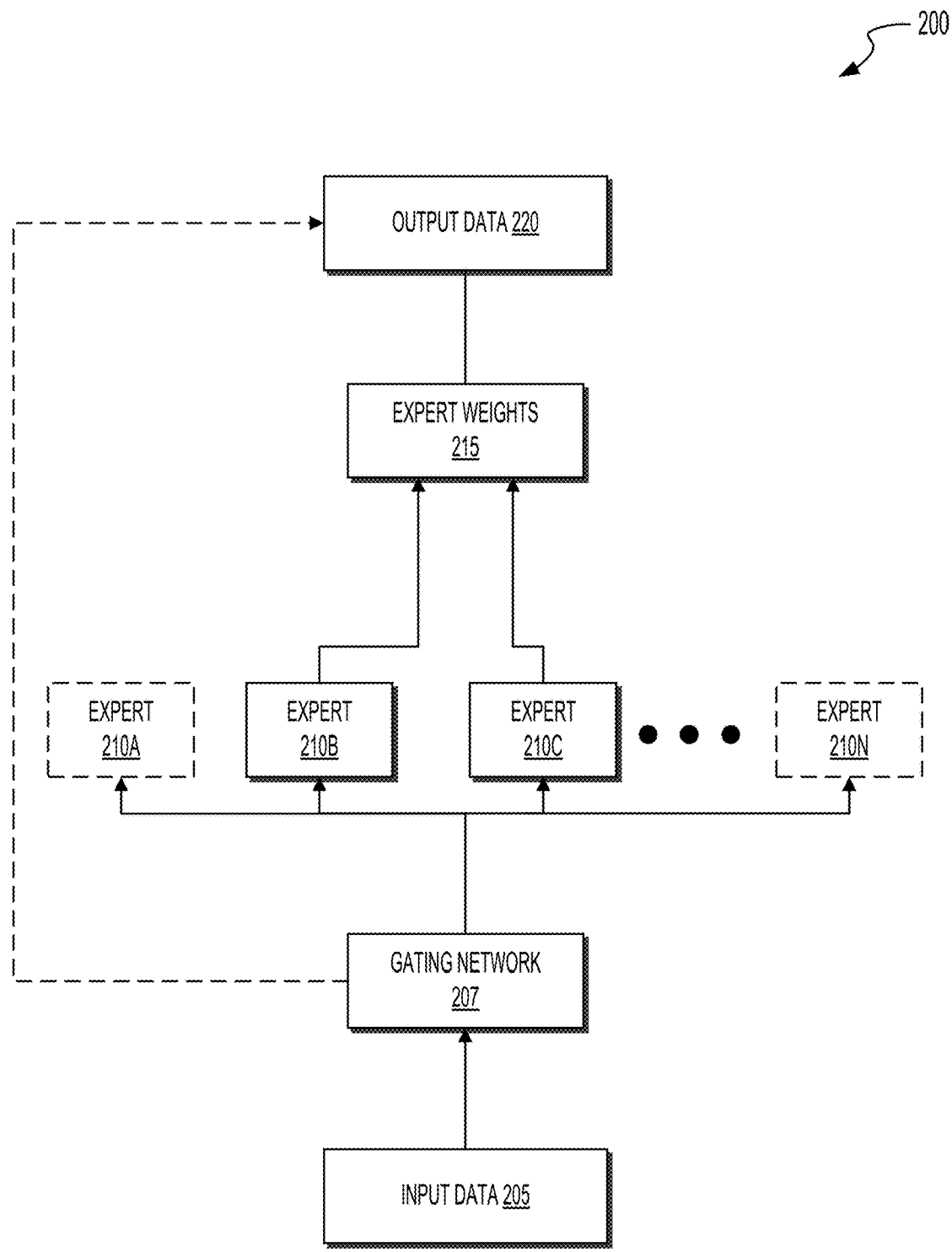
FIG. 2 is a block diagram illustrating the architecture of an example mixture-of-experts model, in accordance with one or more implementations.

Referring now to FIG. 2, illustrated is a block diagram of an example MoE model 200, in accordance with one or more implementations. The MoE model 200 can include at least one gating network 207 and one or more experts 210A-210N (sometimes generally referred to as "expert(s) 210"). The MoE model 200 can be structured to receive input data 205, select a subset of the experts 210 for activation, and combine outputs from the selected experts 210A-210N using expert weights 215 to generate output data 220. In some implementations, the MoE model 200 can use a gating network 207 to determine which experts 210 to activate for a given input data 205. The MoE model 200 can be used to implement a mixture-of-experts model architecture in a distributed or non-distributed computing environment. The experts 210 may be similar to, and include any of the structure or implement any of the functionality of, the experts 190 of FIG. 1. The MoE model 200 may be similar to, and include any of the structure or implement any of the functionality of, the MoE model 180 of FIG. 1.

The MoE model 200 can process input data 205 to generate corresponding output data 220. The input data 205 can include any type of data suitable for processing by a machine learning model, such as text, images, audio, or tabular data, among others. The input data 205 can be received by the gating network 207. The gating network 207 can process the input data 205 to determine a subset of experts 210A-210N to activate for the given input data 205. In some implementations, the gating network 207 can use learned parameters or rules to select the subset of experts 210A-210N, such as by computing a sparse activation vector or by applying a threshold to gating scores generated by the gating network 207. In some implementations, the gating network 207 can include one or more neural network layers or other machine-learning layers trained/updated to process input data 205 and generate gating scores or selection signals for each of the experts 210A-210N.

The experts 210A-210N can each include a neural network (e.g., a transformer-based neural network) that is trained/updated to process input data 205 (or portions thereof) routed by the gating network 207. For given input data 205, the gating network 207 can select a subset of experts 210, shown here as the active experts 210B and 210C, for activation. The selected experts 210B and 210C can receive the input data 205 and generate respective outputs. The unselected experts, such as expert 210A and expert 210N, can remain inactive for the given input data 205. In some implementations, the experts 210A-210N can include different neural network architectures, such as transformer-based neural networks, feedforward networks, convolutional networks, or recurrent networks, among others. In one example, the experts 210A-210N can include feedforward neural network trained for language modeling or multimodal language model. It should be understood that the MoE model 200 may include any number of experts 210.

In this example, the experts 210B and 210C have been selected via the gating network 207 to process the input data 205. The input data 205 or portions thereof can be routed to the selected experts 210 and executed to generate respective outputs. The respective outputs generated by the selected/active experts 210B and 210C can be provided applied to the expert weights 215. The expert weights 215 can include a set of coefficients or weights generated by the gating network 207, which can be used to combine the outputs of the selected experts 210B and 210C, in some implementations. The expert weights 215 can apply a weighted sum or another aggregation operation to the outputs of the selected experts 210B and 210C to generate the output data 220. In some implementations, the expert weights 215 can be determined dynamically for each input data 205, such as by computing softmax-normalized gating scores. The output data 220 can include the output result of executing the MoE model 200, which may be a next-token prediction, a class prediction, a regression value, or an embedding vector, among any other possible output. For example, the output data 220 can include a generated token sequence for a language modeling task.

The data processing system 105 can execute the attribute obtainer 145. The attribute obtainer 145 can obtain a set of attributes 135 from the processing components 130 of the distributed computing environment 120. The attribute obtainer 145 can collect hardware attributes from the processing components 130 using one or more methods. As described herein, the attribute obtainer 145 can communicate with software agents or APIs to obtain the processing component 130 properties as part of the attributes 135. The processing component 130 properties can include an amount of memory, a memory bandwidth, a processing capability, or a number of processing circuits, among others. The attribute obtainer 145 can collect additional device properties such as current utilization, cache size, or interconnect type. The attribute obtainer 145 can retrieve the attributes 135 from each processing component 130 individually or in aggregate.

The attribute obtainer 145 can query hardware telemetry data from the processing components 130. The attribute obtainer 145 can monitor resource usage of the processing components 130 and aggregate the collected data as part of the attributes 135 for use the operations described herein. In some implementations, the attribute obtainer 145 can poll system APIs and/or use monitoring frameworks (e.g., hardware- or device-specific interfaces, etc.) of the distributed computing environment 120 to obtain the attributes 135. The attribute obtainer 145 can store the attributes 135 in the storage 115 for access by other components of the data processing system 105. In some implementations, the attribute obtainer 145 can store the attributes 135 in the storage 115 as a time series data structure. The attribute obtainer 145 can maintain historical values of the attributes 135 such that the data processing system 105 can access prior states of the processing components 130 for various operations described herein.

The attribute obtainer 145 can obtain the attributes 135 in response to various conditions. In some implementations, the attribute obtainer 145 can obtain the attributes 135 in response to a request from via operator input to the data processing system 105 (e.g., via a graphical user interface, a command-line interface, etc.). In some implementations, the attribute obtainer 145 can obtain the attributes 135 upon detecting a condition to obtain attributes from the distributed computing environment 120. For example, the attribute obtainer 145 can obtain the attributes 135 upon detecting a change in the structure or operational characteristics of the distributed computing environment 120 (e.g., via communicated errors or telemetry data). In another example, the attribute obtainer 145 can obtain the attributes 135 upon detecting a fault in the distributed computing environment 120. In some implementations, the attribute obtainer 145 can obtain the attributes 135 upon receiving a request from an external computing system to initiate an allocation process for a corresponding MoE model 180.

The attribute obtainer 145 can receive a request to allocate a specified MoE model 180 to a specified distributed computing environment 120 or to a specified subset of processing components 130A-130N within the distributed computing environment 120. The request can include identifiers for the MoE model 180 and for the target distributed computing environment 120 or for one or more processing components 130A-130N, such as nodes or clusters. In response to the request, the attribute obtainer 145 can retrieve existing attributes 135 associated with the distributed computing environment 120 from the storage 115. In some implementations, the attribute obtainer 145 can determine that the existing attributes 135 are outdated or incomplete. The attribute obtainer 145 can then initiate a query to the distributed computing environment 120 or to the specified processing components 130A-130N to obtain an up-to-date set of attributes 135. The attribute obtainer 145 can collect information such as available memory, memory bandwidth, processing capability, number of processing circuits, current utilization, interconnect type, or other hardware characteristics for each processing component 130A-130N.

In some implementations, the attribute obtainer 145 can dynamically determine a resource vector for the specified MoE model 180. The attribute obtainer 145 can derive values for the resource vector from configuration data associated with the MoE model 180. For example, the attribute obtainer 145 can access model configuration files, metadata, or deployment descriptors that specify the computational requirements of each expert 190 included in the MoE model 180. The attribute obtainer 145 can derive values for the resource vector of each expert 190 by analyzing configuration data, telemetry data, or metadata associated with the MoE model 180. In some implementations, the attribute obtainer 145 can access model configuration files or deployment descriptors that specify computational requirements for each expert 190. In some implementations, the attribute obtainer 145 can monitor resource usage during inference or training operations (e.g., via agents executing on or associated with processing components 130 of the distributed computing environment 120) to determine empirical values for resource consumption by each expert 190. The attribute obtainer 145 can aggregate or compute the derived values for each expert 190 and store the resulting resource vectors in the storage 115 for use by other components of the data processing system 105.

The data processing system 105 can execute the co-activation determiner 150 to determine a set of co-activation metrics 170 for the experts 190 of the MoE model 180 to be allocated to the distributed computing environment 120. The co-activation determiner 150 can analyze historical inference data or real-time inference data to identify patterns of expert co-activation. The co-activation determiner 150 can process telemetry logs generated during execution of the MoE model 180 to construct a co-activation matrix. The co-activation determiner 150 can determine (e.g., based on communications from agents executing on the computing system where the MoE model 180 is deployed for co-activation determination), for each inference or training operation, which experts 190 are activated for a given input and can increment corresponding entries in the co-activation matrix to reflect observed co-activation events. In some implementations, the co-activation determiner 150 can compute co-activation probabilities for pairs of experts 190 by normalizing the co-activation counts over the total number of inference or training operations processed.

In some implementations, the co-activation determiner 150 can determine the set of co-activation metrics 170 using a greedy allocation strategy or by referencing a previous allocation determined according to techniques described herein. The co-activation determiner 150 can use a greedy allocation to assign experts 190 to processing components 130A-130N of the distributed computing environment 120 and/or of a different computing system, and can monitor the resulting activation patterns to estimate co-activation metrics 170. In some implementations, the co-activation determiner 150 can update the co-activation metrics 170 based on additional data processed via the MoE model 180, such that the co-activation metrics 170 reflect the actual or expected workload distribution in the distributed computing environment 120. The co-activation determiner 150 can store the co-activation metrics 170 in the storage 115 for subsequent use in generating/updating the QUBO data structure 175.

In some implementations, the co-activation determiner 150 can derive the set of co-activation metrics 170 from training or inference operations performed using a specified, predetermined, or representative dataset. The dataset can correspond to an average or expected type of workload to be executed by the MoE model 180. The co-activation determiner 150 can cause the MoE model 180 to process the dataset in a test deployment, in the distributed computing environment 120, or in a different computing environment to empirically determine the frequency with which pairs of experts 190 are activated together. The co-activation determiner 150 can aggregate the observed co-activation events to generate a co-activation probability matrix indexed by expert pairs, as described herein.

The data processing system 105 can execute the data structure generator 155 to generate the QUBO data structure 175 that encodes the allocation of experts 190 of the MoE model 180 to the processing components 130 as a bin-packing problem. The data structure generator 155 can construct the QUBO data structure 175 as a Q matrix for the quadratic unconstrained binary optimization problem. The QUBO data structure 175 can be generated such that each binary variable represents an assignment of a particular expert 190 to a particular processing component 130. In some implementations, the data structure generator 155 can define a set of binary variables, where each variable corresponds to a possible mapping of an expert 190 to a processing component 130. The QUBO data structure 175 can be structured such that the objective function is quadratic, with linear terms representing individual assignment costs and quadratic terms representing pairwise interaction costs.

The data structure generator 155 can model the objective cost function of the QUBO data structure 175 according to the attributes 135 of the processing components 130, resource vectors generated for the experts 190, and the co-activation metrics 170. The attributes 135 can include, for example, memory capacity, memory bandwidth, processing capability, or network topology information for each processing component 130. The resource vectors generated for the experts 190 can specify the computational, memory, bandwidth, or cache requirements of each expert 190. The co-activation metrics 170 can represent the frequency or probability with which pairs of experts 190 are activated together. The data structure generator 155 can incorporate the attributes 135, the resource vectors, and the co-activation metrics 170 into the construction of the Q matrix of the QUBO data structure 175. In some implementations, the data structure generator 155 can encode placement constraints, communication costs, and resource limits as terms in the objective function. An example objective cost function modeled by the data structure generator 155 can be represented as follows:

$$f(x) = \alpha_1 \cdot \sum_{i,j} P_{ij} \cdot x_{ij} + \alpha_2 \cdot \sum_{i,j,k,l} C_{ijkl} \cdot x_{ij} \cdot x_{kl} + \alpha_3 \cdot L(x) + \alpha_4 \cdot E(x)$$

In the above equation, the values $\alpha_1$ are hyperparameter coefficients for the cost terms, and the values of x are the decision variables for placement of experts 190 to processing components 130. The term $P_{ij}$ is the placement cost of placing expert i on resource (e.g., processing component 130) j, which can be a function of the resource vector of the expert and/or the processing capabilities of the corresponding processing component 130. The term $C_{ijkl}$ is the communication cost when expert i placed on resource j communicates with expert k placed on resource l, which can be a function of the co-activation metrics 170 of the experts i and k, the data volume transferred between the experts i and k, and the communication bandwidth between processing resources j and l.

The term L (x) can be a penalty term for uneven resource utilization across all processing components 130 considered for placement of the experts 190. The term E (x) can be an optimization term for power consumption, which can be a function of the number of processing components 130 that are active when executing the MoE model 180, the number of active experts 190 in the MoE model 180, and/or the number of parameters/weights (e.g., memory size) of each expert 190. In some implementations, the objective function may include additional penalty term(s) for placement of replicas of experts 190 on the same resource (e.g., processing component 130). This term can be used because placing an expert 190 and its replica on the same processing component 130 would obviate the redundancy advantages of using the replica.

In the QUBO data structure 175, the linear terms of the objective cost function can encode the cost of assigning an individual expert 190 to a processing component 130, based on the resource requirements (e.g., according to resource vectors) of the expert 190 and the available capacity of the processing component 130 as specified by the attributes 135. The quadratic terms can encode the communication cost incurred when two experts 190 that are frequently co-activated, as indicated by the co-activation metrics 170, are assigned to different processing components 130. The objective cost function can further include penalty terms for violating resource constraints or for assigning replicas of the same expert 190 to the same processing component 130. The use of replicas for experts (e.g., number of replicas for each expert, etc.) may be specified via configuration settings associated with the MoE model. The data structure generator 155 can generate the QUBO data structure 175 such that a solution to the QUBO problem provides an assignment of experts 190 to processing components 130 that minimizes the total cost subject to the modeled constraints.

The objective function encoded by the Q matrix of the QUBO data structure 175 can include a penalty term for uneven resource distribution among the processing components 130A-130N of the distributed computing environment 120. The penalty term can be represented as a function that increases the objective value when the allocation of experts 190 to the processing components 130A-130N results in a significant imbalance in resource usage, such as memory, bandwidth, or compute capacity. For example, the Q matrix can include quadratic or linear terms that penalize assignments where the aggregate resource utilization of one or more processing components 130A-130N deviates beyond a predetermined threshold from the mean or target utilization across all processing components 130A-130N. In some implementations, the Q matrix can further include a term for optimal energy consumption, where the objective function can be augmented with coefficients that reflect the energy profile of each processing component 130A-130N.

The energy consumption term can be modeled such that assignments of experts 190 to processing components 130A-130N with lower energy usage are favored, or such that the total estimated energy consumption across all assignments is minimized. In some implementations, the Q matrix can encode the energy consumption term as a weighted sum of the estimated energy required to execute the assigned experts 190 on the corresponding processing components 130A-130N, based on telemetry data or device specifications included in the attributes 135. The inclusion of these terms in the Q matrix can provide that the resulting solution to the QUBO problem reflects both balanced resource allocation and energy-aware placement of the experts 190 in the MoE model 180.

The data processing system 105 can include at least one expert assigner 160. The expert assigner 160 can receive a quadratic unconstrained binary optimization (QUBO) data structure 175 generated by the data structure generator 155. The expert assigner 160 can solve the QUBO problem by applying one or more optimization techniques. In some implementations, the expert assigner 160 can use simulated annealing, tabu search, or other metaheuristic algorithms to identify a solution to the QUBO problem. In some implementations, the expert assigner 160 can use mixed integer linear programming or constraint programming approaches to solve the QUBO problem. In some implementations, the expert assigner 160 can select a solver based on the problem size or available computational resources.

For example, the expert assigner 160 can evaluate (e.g., using rule-based techniques, look-up tables, etc.) the characteristics of QUBO problem for which the QUBO data structure 175 was generated, such as the number of experts 190, the number of processing components 130A-130N, and/or the density of the Q matrix, among other aspects, to determine a suitable solving technique. The expert assigner 160 can select among multiple solving approaches, including simulated annealing, tabu search, mixed integer linear programming, constraint programming, or metaheuristic approaches, among other approaches. In one example, the expert assigner 160 can use a quantum computing system to solve the QUBO problem. To do so, the expert assigner 160 can prepare the QUBO data structure 175 for submission to a quantum processor by encoding the binary decision variables and cost coefficients in a format compatible with quantum annealing or gate-based quantum algorithms. The expert assigner 160 can transmit the QUBO data structure 175 to the quantum computing system and receive a candidate solution representing an assignment of experts 190 to processing components 130A-130N. The expert assigner 160 can validate the solution to confirm that all placement constraints (e.g., memory limits, bandwidth requirements, communication costs, etc.) are satisfied. For example, the expert assigner 160 can perform a verification step by evaluating the assignment against the attributes 135 of the processing components 130A-130N, the resource vectors of the experts 190, and co-activation metrics 170 to determine that the assignment/placement of the experts 190 to the processing components 130 is suitable. In some implementations, the expert assigner 160 can re-invoke the solver with adjusted parameters and/or constraints if an initial solution does not satisfy the placement requirements.

To map experts 190 to the processing components 130, the expert assigner 160 can analyze the values of the decision variables defined from the solution derived via the QUBO data structure 175. Each decision variable can represent a potential assignment of an expert 190 to a processing component 130A-130N of the distributed computing environment 120. The expert assigner 160 can identify which decision variables have been set to an assignment value, such as a binary value of one, indicating that a particular expert 190 is to be assigned to a particular processing component 130A-130N. The expert assigner 160 can generate an assignment mapping that specifies, for each expert 190, the corresponding processing component 130A-130N to which the expert 190 is assigned. The expert assigner 160 can update deployment mappings or configuration data for the MoE model 180 to reflect the assignment of the experts 190 according to the determined solution of the QUBO problem.

The expert assigner 160 can implement the assignment of the experts 190 by communicating with the distributed computing environment 120 and/or the components thereof. In some implementations, the expert assigner 160 can execute assignment instructions to move model weights of each expert 190, allocate resources, and/or update model serving configurations to deploy the MoE model 180 to the processing components 130 of the distributed computing environment 120. The expert assigner 160 can communicate with endpoint(s) of the distributed computing environment 120 to determine the status of the deployment and confirm that the experts 190 have been assigned to the intended processing components 130A-130N. In some implementations, the expert assigner 160 can initiate adaptive re-optimization by invoking the QUBO solver again when workload patterns or resource availability change, as described in further detail in connection with FIG. 3. In such circumstances, the expert assigner 160 can repeat the assignment process as needed to maintain alignment with current workload and resource conditions.

The data processing system 105 can include at least one model executor 165. The model executor 165 can communicate with the distributed computing environment 120 to execute operations of the MoE model 180 using the assigned processing components 130. After the model weights/parameters of the experts 190 of the MoE model 180 have been transferred to and initialized at the processing components 130, the model executor 165 can transmit inference data or training data to the distributed computing environment 120 for processing by the MoE model 180. In some implementations, the model executor 165 can forward input data to the processing components 130 according to the assignment of experts 190 determined by the expert assigner 160. For example, the model executor 165 can use network protocols or remote procedure calls to transmit data to the distributed computing environment 120. The model executor 165 can initiate inference jobs or training jobs by sending job requests and/or configuration data to the processing components 130.

The distributed computing environment 120 (or nodes/servers/processing components 130 thereof) can receive one or more jobs or tasks from the data processing system 105, an external computing system, or via a user interface, among other sources. The distributed computing environment 120 can process each received job or task by allocating resources (e.g., memory, initiating job execution data structures, updating job queues, etc.) among the processing components 130. The distributed computing environment 120 can execute the MoE model 180 using the assigned processing components 130 to perform inference or training operations associated with the received job or task. In some implementations, the distributed computing environment 120 can route input data corresponding to the job or task to the processing components 130 storing (e.g., in memory) appropriate experts 190 of the MoE model 180. The distributed computing environment 120 (or nodes/servers/processing components 130 thereof) can execute the experts 190 (e.g., using the techniques described in connection with FIG. 2) and generate output data. The distributed computing environment 120 (or nodes/servers/processing components 130 thereof) can provide the output data to the data processing system 105, external computing system, and/or user interface that submitted the job or task. In some implementations, the distributed computing environment 120 can queue multiple jobs or tasks and schedule execution of the MoE model 180 based on resource availability or priority criteria.

The model executor 165 can receive output data generated by the MoE model 180 from the distributed computing environment 120. For example, the model executor 165 can communicate via APIs or other interfaces described herein to obtain inference results or training results from the processing components 130. In some implementations, the model executor 165 can aggregate output data from multiple processing components 130 to generate a final result for the input data for a given processing task. In some implementations, the model executor 165 can monitor the status of the inference or training operations by receiving status updates or telemetry data from the distributed computing environment 120, based on the communication techniques described herein. In some implementations, the model executor 165 can perform health checks by querying the processing components 130 and/or nodes/servers of the distributed computing environment 120 to verify readiness or operational state before or during execution of the MoE model 180. The model executor 165 can provide the output data to downstream systems, storage 115, or external computing systems.

Figure 3:
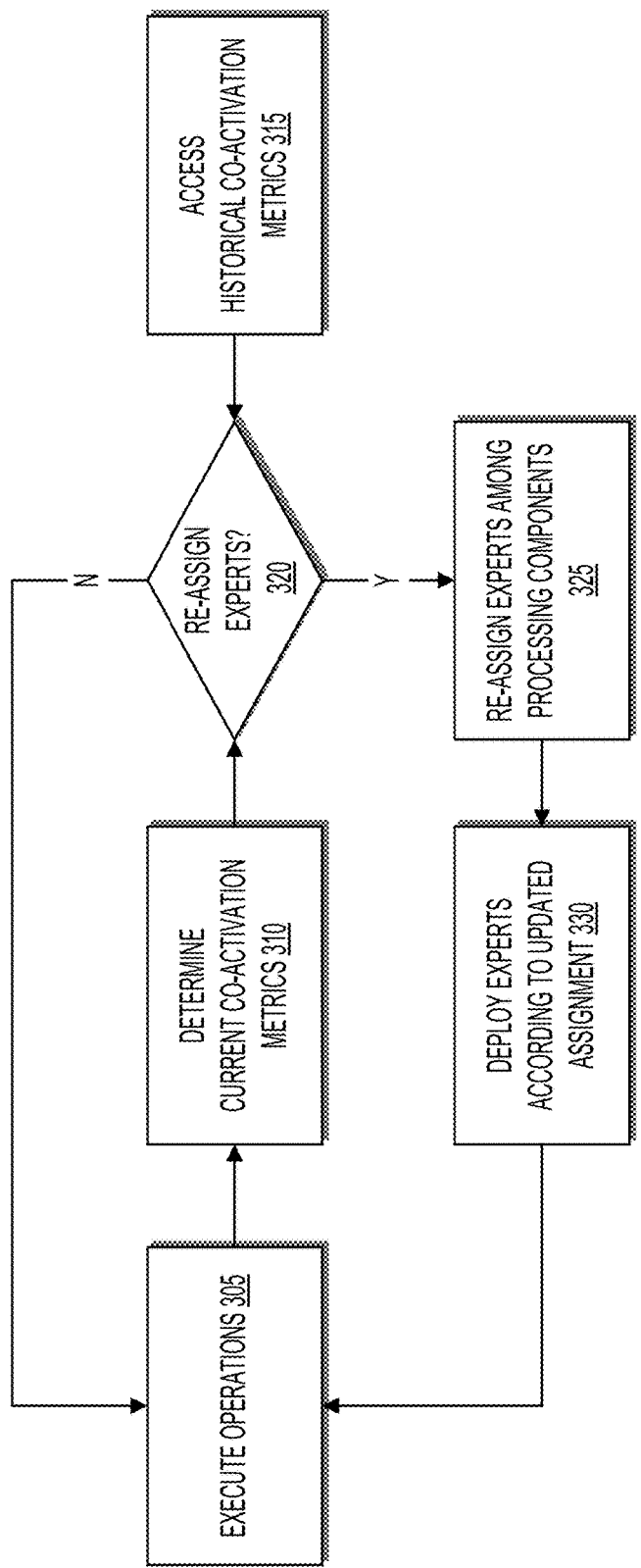
FIG. 3 is a flow diagram illustrating a process for expert placement optimization in a distributed mixture-of-experts model deployment, in accordance with one or more implementations.

Referring now to FIG. 3, depicted is a flow diagram of a method 300 for expert placement optimization in a distributed Mixture-of-Experts model deployment. The method 300 can be performed by any of the computing devices described herein, including but not limited to the computing system 500 of FIG. 5 or the data processing system 104 of FIG. 1. In brief overview, the method 300 can include executing inference operations (OPERATION 305), determining current co-activation metrics (OPERATION 310), referencing historical co-activation metrics (OPERATION 315), determining whether to re-assign experts (OPERATION 320), re-assigning experts among processing components (OPERATION 325), and deploying experts according to an updated assignment (OPERATION 330).

The method 300, at OPERATION 305, can include executing inference operations or training operations via an MoE model (e.g., MoE model 180 of FIG. 1). The MoE model may be deployed on and executed by a distributed computing environment (e.g., the distributed computing environment 120 of FIG. 1). For example, inference/training operations can be executed to process input data using the MoE model distributed across multiple hardware resources (e.g., processing components 130) in the distributed computing environment. When executing the MoE model, input data can be routed to a gating network (e.g., gating network 207 of FIG. 2) that selects a subset of experts (e.g., experts 190, experts 210, etc.) for activation. The selected experts can process the input data and generate intermediate or final outputs. The outputs from the experts can be aggregated or combined according to expert weights determined by the gating network. If the operations are training operations, the output may be used to calculate a loss for the MoE model, which may be used to update the parameters of the MoE model using a suitable training technique. In some implementations, the results of the operations can be stored or transmitted to downstream systems for further processing.

The method 300, at OPERATION 310, can include determining current co-activation metrics of the experts of the MoE model. Current co-activation metrics (e.g., co-activation metrics 170) can be determined by monitoring which experts are activated together during the processing operations performed during OPERATION 305. In some implementations, telemetry logs can be obtained/retrieved to record the activation status of each expert for each input processed. The co-activation frequency or probability for each pair of experts can be computed based on the collected telemetry data, according to the techniques described herein in connection with FIG. 1. In one example, the resulting co-activation metrics can be represented as a matrix indexed by expert pairs. In some implementations, the co-activation metrics can be updated periodically or in response to performing additional operations. The co-activation metrics may be stored as time-series data, such that updates to the co-activation metrics can be tracked over time.

The method 300, at OPERATION 315, can include accessing historical co-activation metrics. Historical co-activation metrics can be referenced to compare current expert activation patterns with those observed in previous periods. In some implementations, historical co-activation data can be retrieved from storage (e.g., storage 115) or other repository for the MoE model. The historical co-activation metrics can be used to identify trends or shifts in expert co-activation over time, or when characteristics of the data processed by the MoE model changes. The historical co-activation metrics retrieved may be a set of co-activation metrics used to assign the experts of the MoE model to processing components of the distributed computing environment currently executing the MoE model.

The method 300, at OPERATION 320, can include determining whether to re-assign the experts of the MoE model among the processing components of the distributed computing environment. To do so, the current and historical co-activation metrics can be compared to determine whether the general/average interactions between experts of the MoE model have changed. A determination can be made regarding whether to re-assign experts among available hardware resources based on detected changes in co-activation patterns. If a significant deviation or imbalance is identified in the frequency or probability with which pairs of experts are activated together, a process can be initiated to generate a new assignment of experts to hardware resources. In some implementations, the comparison between current co-activation metrics and historical co-activation metrics can be performed by computing a difference value for each pair of experts by subtracting the historical co-activation value from the current co-activation value in each co-activation metric matrix. The process can aggregate the difference values across all expert pairs to generate a global drift metric and/or can compare each difference value to a predetermined threshold.

If the global drift metric or any individual difference value (or set/aggregation of difference values) exceeds the threshold, the process can determine that there has been a significant deviation or imbalance in the co-activation patterns of the experts of the MoE model since the previous assignment to the processing components of the distributed computing environment. In some implementations, doing so may include analyzing the distribution of difference values to detect changes in workload characteristics or input distributions. If it is determined that there has been a deviation between the historical and current co-activation metrics, the method 300 can proceed to OPERATION 325. Otherwise, if it is determined that there has not been a deviation between the historical and current co-activation metrics (e.g., threshold not exceeded, etc.), the method 300 can return to OPERATION 305 to continue executing operations according to the current assignment of experts of the MoE model to the processing components of the distributed computing environment.

The method 300, at OPERATION 325, can include reassigning experts among processing components. Experts can be re-assigned among processing components based on updated co-activation metrics and resource constraints. To do so, any of the operations described in connection with FIG. 1 can be performed. For example, a QUBO optimization problem can be formulated using at least one QUBO data structure (e.g., a QUBO data structure 175) to determine a new assignment of experts to the processing components of the distributed computing environment. In doing so, the current co-activation metrics determined at OPERATION 310 can be used in connection with the techniques of FIG. 1. The resulting assignment can specify which experts are to be moved or re-deployed to different processing components of the distributed computing environment.

The method 300, at OPERATION 330, can include deploying experts of the MoE model according to the updated assignment. Experts of the MoE model can be deployed to hardware resources based on the updated assignment generated by the optimization process. In some implementations, model weights or parameters associated with each expert can be transferred to the designated processing components. Deployment instructions can be issued to initialize or update the experts on the processing components. In some implementations, the re-assignment process can be performed dynamically to limit disruption to operations of the distributed computing environment. For example, re-assignment process can include transferring model parameters and/or weights for one or more experts to different processing components according to the new mapping. In some implementations, only the experts that have been re-assigned can be transferred while others previously deployed to the distributed computing system can remain unchanged, thereby reducing downtime by reducing the number of experts that are to be re-deployed. Re-assignment can include update routing or scheduling data structures to reflect the new expert placement among the processing components of the distributed computing environment.

Figure 4:
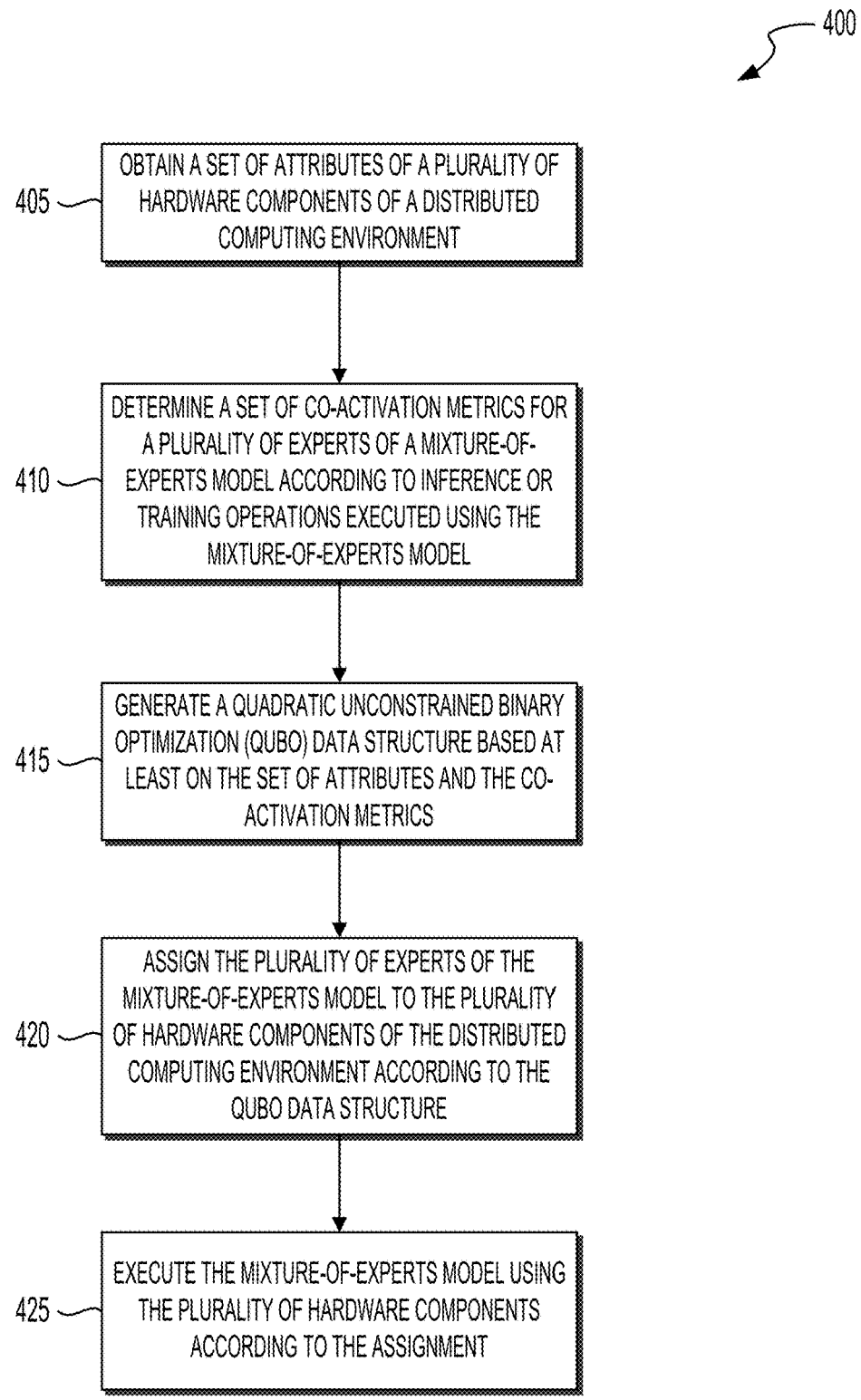
FIG. 4 is a flow chart illustrating a method for optimizing placement of experts in a mixture-of-experts model using QUBO-based bin packing in a distributed computing environment, in accordance with one or more implementations.

Referring now to FIG. 4, illustrated is a flow chart of a method 400 for optimizing placement of experts in a mixture-of-experts model using QUBO-based bin packing in a distributed computing environment. The method 400 can be executed, performed, or otherwise carried out by any of the computing systems or devices described herein (e.g., the data processing system 105 of FIG. 1, the computing system 500 of FIG. 5, etc.). In brief overview of the method 400, the method 400 can include obtaining a set of attributes of a plurality of hardware components of a distributed computing environment (OPERATION 405), determining a set of co-activation metrics for a plurality of experts of a mixture-of-experts model according to inference or training operations executed using the mixture-of-experts model (OPERATION 410), generating a QUBO data structure based at least on the set of attributes and the co-activation metrics (OPERATION 415), assigning the plurality of experts of the mixture-of-experts model to the plurality of hardware components of the distributed computing environment according to the QUBO data structure (OPERATION 420), and executing the mixture-of-experts model using the plurality of hardware components according to the assignment (OPERATION 425).

The method 400, at OPERATION 405, can include obtaining a set of attributes (e.g., attributes 135) of a plurality of hardware components (e.g., processing components 130) of a distributed computing environment (e.g., the distributed computing environment 120). To do so, any of the attributes of the attribute obtainer 145 and/or the data processing system 105 of FIG. 1 can be performed. The set of attributes can be collected from hardware components such as clusters/nodes/servers, memory devices, GPUs, or other computing components, as described herein. The attributes can include information related to memory size, available bandwidth, processing capability, or cache size. In some implementations, the set of attributes can include at least one of an amount of memory, a memory bandwidth, a processing capability, or a number of processing circuits for each hardware component.

In some implementations, the attributes can be obtained using telemetry agents of the distributed computing environment that monitor current utilization and report device properties. The collected attributes can be stored in a data structure for subsequent processing. In some implementations, the set of attributes can be updated periodically or in response to changes in the distributed computing environment, as described herein. The hardware components from which the attributes are obtained may be identified based on a request to deploy a MoE model. For example, in some implementations, a request to deploy the MoE model in the distributed computing environment can be received, which can identify a subset of hardware components and/or nodes/servers/clusters upon which the MoE model is to be deployed. The hardware components of the nodes/servers/clusters can be identified from the request, and the attributes of those components can subsequently be obtained.

The method 400, at OPERATION 410, can include determining a set of co-activation metrics for a plurality of experts (e.g., experts 190, experts 210, etc.) of a MoE model (e.g., the MoE model 180, etc.) according to inference or training operations executed using the MoE model. To do so, any of the attributes of the co-activation determiner 150 and/or the data processing system 105 of FIG. 1 can be performed. The set of co-activation metrics can be derived by monitoring which experts are activated together during model execution. In some implementations, a set of co-activation metrics can be determined by causing the MoE model to process a predetermined dataset (e.g., a predetermined inference or training dataset). In some implementations, telemetry logs can be analyzed to identify patterns of expert activation for each input processed by the MoE model. The co-activation metrics can be represented as a matrix indexed by expert pairs, where each entry indicates a frequency or probability of co-activation. In some implementations, the co-activation metrics can be updated as additional inference or training data is processed.

The method 400, at OPERATION 415, can include generating a QUBO data structure (e.g., the QUBO data structure 175) based at least on the set of attributes and the co-activation metrics. To do so, any of the attributes of the data structure generator 155 and/or the data processing system 105 of FIG. 1 can be performed. The QUBO data structure can be constructed such that binary variables represent possible assignments of experts to hardware components. In some implementations, the QUBO data structure can encode placement constraints, communication costs, load balancing terms, and/or energy efficiency factors, as described herein. The cost function of the QUBO data structure can include quadratic terms that capture pairwise interactions between experts and may include penalties for assigning frequently co-activated experts to different devices. The QUBO data structure can be represented as a matrix (e.g., a Q matrix, as described herein), with entries corresponding to linear and quadratic cost coefficients. In some implementations, the QUBO data structure can be generated further based on a resource vector associated with each expert of the MoE model. The resource vector may indicate the various requirements for executing the corresponding expert on computer hardware. In some implementations, one or more dimensions of the resource vector may be function of the number of parameters in the corresponding expert.

The method 400, at OPERATION 420, can include assigning the plurality of experts of the MoE model to the plurality of hardware components of the distributed computing environment according to the QUBO data structure. To do so, any of the attributes of the expert assigner 160 and/or the data processing system 105 of FIG. 1 can be performed. The assignment can be determined by solving the QUBO problem using an optimization technique such as simulated annealing, tabu search, or mixed integer linear programming, among others. In some implementations, the optimization function used to solve the QUBO problem encoded by the QUBO data structure can be selected from multiple possible optimization functions applicable. The set of assignments can be generated by solving QUBO problem using the selected optimization function. In some implementations, a quantum computing system can be used to solve the QUBO problem encoded by the QUBO data structure. The set of assignments can be identified from the decision variables output from the optimization process.

In some implementations, the assignment can be validated to confirm that resource constraints and placement requirements are satisfied, as described herein. The set of assignments can specify a mapping of each expert to a selected hardware component based on the solution to the QUBO data structure. The assignment can be stored for reference during model execution or future re-optimization. The assignment process can be repeated as needed in response to changes in workload or hardware availability. In some implementations, a router network (e.g., gating network 207) of the MoE model can be automatically assigned to one or more hardware components. In some implementations, replicas of the routing/gating network of the MoE model can be stored across multiple hardware components. For example, replicas of the routing/gating network of the MoE model can be stored in each processing component to which the experts of the MoE model are assigned.

The method 400, at OPERATION 425, can include executing the MoE model using the plurality of hardware components according to the assignment. To do so, any of the attributes of the model executor 165 and/or the data processing system 105 of FIG. 1 can be performed. The MoE model can be deployed such that each expert is loaded onto (e.g., stored in working memory of) the assigned hardware component. In some implementations, input data can be routed to the appropriate experts based on the assignment mapping. The hardware components can process inference or training operations as described herein. Output data generated by the experts can be aggregated or combined according to the model configuration (e.g., as described in connection with FIG. 2). In some implementations, the execution of the MoE model can be monitored to collect performance metrics or detect changes in workload patterns, which may be used to re-assign experts, for example, as described in connection with FIG. 3.

Figure 5:
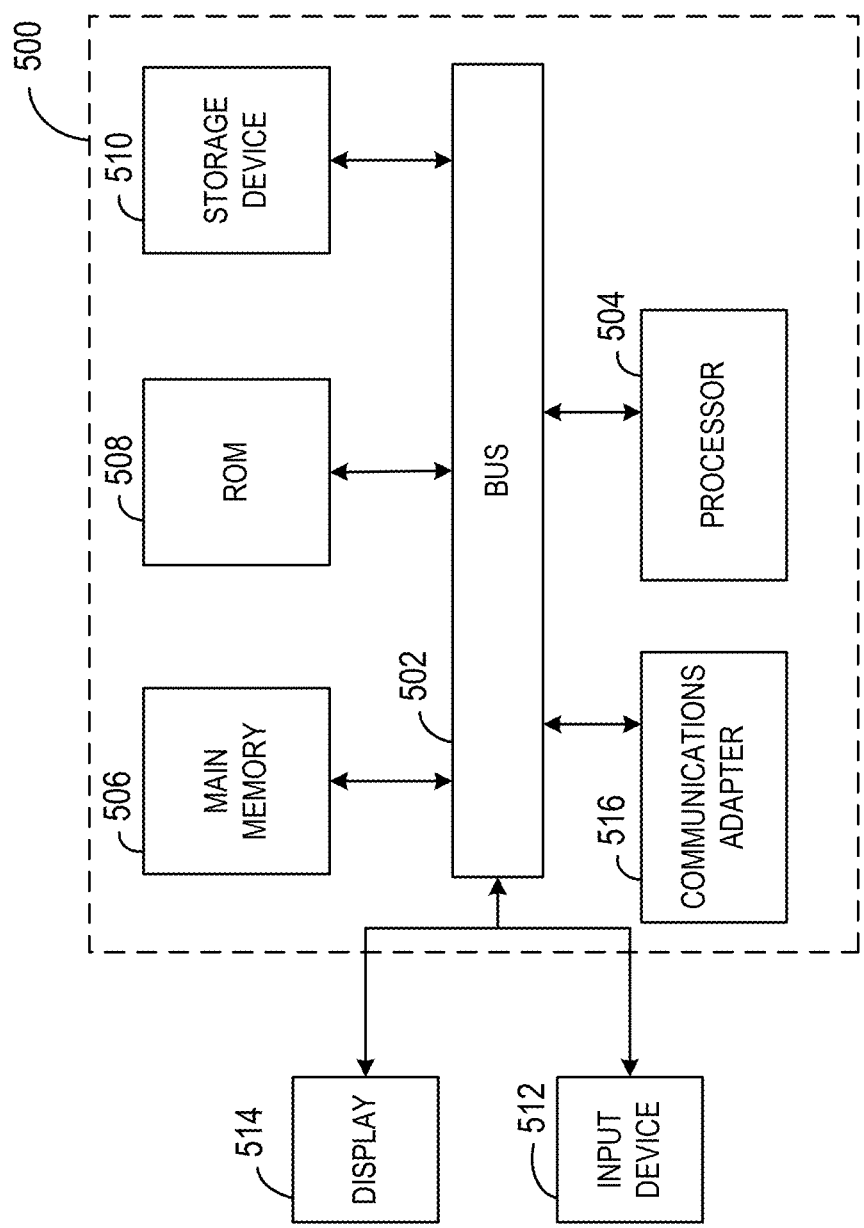
FIG. 5 illustrates a block diagram of an example computing system suitable for use in the various arrangements described herein, in accordance with one or more implementations.

FIG. 5 is a component diagram of an example computing system suitable for use in the various implementations described herein, according to an example implementation. For example, the computing system 500 may implement the data processing system 105, one or more of the processing components 130 (or a portion thereof), or the distributed computing environment 120 (or portions thereof) of FIG. 1, or various other example systems and devices described in the present disclosure.

The computing system 500 includes a bus 502 or other communication component for communicating information and a processor 504 coupled to the bus 502 for processing information. The computing system 500 also includes main memory 506, such as a RAM or other dynamic storage device, coupled to the bus 502 for storing information, and instructions to be executed by the processor 504. Main memory 506 can also be used for storing position information, temporary variables, or other intermediate information during execution of instructions by the processor 504. The computing system 500 may further include a ROM 508 or other static storage device coupled to the bus 502 for storing static information and instructions for the processor 504. A storage device 510, such as a solid-state device, magnetic disk, or optical disk, is coupled to the bus 502 for persistently storing information and instructions.

The computing system 500 may be coupled via the bus 502 to a display 514, such as a liquid crystal display, or active-matrix display, for displaying information to a user. An input device 512, such as a keyboard including alphanumeric and other keys, may be coupled to the bus 502 for communicating information, and command selections to the processor 504. In another implementation, the input device 512 has a touch screen display. The input device 512 can include any type of biometric sensor, or a cursor control, such as a mouse, a trackball, or cursor direction keys, for communicating direction information and command selections to the processor 504 and for controlling cursor movement on the display 514.

In some implementations, the computing system 500 may include a communications adapter 516, such as a networking adapter. Communications adapter 516 may be coupled to bus 502 and may be configured to enable communications with a computing or communications network or other computing systems. In various illustrative implementations, any type of networking configuration may be achieved using communications adapter 516, such as wired (e.g., via Ethernet), wireless (e.g., via Wi-Fi, Bluetooth), satellite (e.g., via GPS) pre-configured, ad-hoc, LAN, WAN, and the like.

According to various implementations, the processes of the illustrative implementations that are described herein can be achieved by the computing system 500 in response to the processor 504 executing an implementation of instructions contained in main memory 506. Such instructions can be read into main memory 506 from another computer-readable medium, such as the storage device 510. Execution of the implementation of instructions contained in main memory 506 causes the computing system 500 to perform the illustrative processes described herein. One or more processors in a multi-processing implementation may also be employed to execute the instructions contained in main memory 506. In alternative implementations, hard-wired circuitry may be used in place of or in combination with software instructions to implement illustrative implementations. Thus, implementations are not limited to any specific combination of hardware circuitry and software.

The implementations described herein have been described with reference to drawings. The drawings illustrate certain details of specific implementations that implement the systems, methods, and programs described herein. However, describing the implementations with drawings should not be construed as imposing on the disclosure any limitations that may be present in the drawings.

It should be understood that no claim element herein is to be construed under the provisions of 35 U.S.C. § 112 (f), unless the element is expressly recited using the phrase "means for."

As used herein, the term "circuit" may include hardware structured to execute the functions described herein. In some implementations, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some implementations, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some implementations, the one or more processors may be embodied in various ways. The one or more processors may be constructed in a manner sufficient to perform at least the operations described herein. In some implementations, the one or more processors may be shared by multiple circuits (e.g., circuit A and circuit B may comprise or otherwise share the same processor, which, in some example implementations, may execute instructions stored, or otherwise accessed, via different areas of memory). Alternatively or additionally, the one or more processors may be structured to perform or otherwise execute certain operations independent of one or more co-processors.

In other example implementations, two or more processors may be coupled via a bus to enable independent, parallel, pipelined, or multi-threaded instruction execution. Each processor may be implemented as one or more general-purpose processors, ASICs, FPGAs, GPUs, TPUs, digital signal processors (DSPs), or other suitable electronic data processing components structured to execute instructions provided by memory. The one or more processors may take the form of a single core processor, multi-core processor (e.g., a dual core processor, triple core processor, or quad core processor), microprocessor, etc. In some implementations, the one or more processors may be external to the apparatus, for example, the one or more processors may be a remote processor (e.g., a cloud-based processor). Alternatively or additionally, the one or more processors may be internal or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the implementations might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile or non-volatile memories), etc. In some implementations, the non-volatile media may take the form of ROM, flash memory (e.g., flash memory such as NAND, 3D NAND, NOR, 3D NOR), EEPROM, MRAM, magnetic storage, hard discs, optical discs, etc. In other implementations, the volatile storage media may take the form of RAM, TRAM, ZRAM, etc. Combinations of the above are also included within the scope of machine-readable media. In this regard, machine-executable instructions comprise, for example, instructions and data, which cause a general-purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example implementations described herein.

It should also be noted that the term "input devices," as described herein, may include any type of input device including, but not limited to, a keyboard, a keypad, a mouse, joystick, or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative implementations. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The foregoing description of implementations has been presented for purposes of illustration and description. It is not intended to be exhaustive or to limit the disclosure to the precise form disclosed, and modifications and variations are possible in light of the above teachings or may be acquired from this disclosure. The implementations were chosen and described in order to explain the principals of the disclosure and its practical application to enable one skilled in the art to utilize the various implementations and with various modifications as are suited to the particular use contemplated. Other substitutions, modifications, changes, and omissions may be made in the design, operating conditions and implementation of the implementations without departing from the scope of the present disclosure as expressed in the appended claims.

What is claimed is:

1. A system, comprising:
   one or more processors coupled to non-transitory memory, the one or more processors configured to:
   obtain a set of attributes of a plurality of hardware components of a distributed computing environment;
   determine a set of co-activation metrics for a plurality of experts of a mixture-of-experts model according to inference or training operations executed using the mixture-of-experts model;
   generate a quadratic unconstrained binary optimization (QUBO) data structure based at least on the set of attributes and the set of co-activation metrics;
   assign the plurality of experts of the mixture-of-experts model to the plurality of hardware components of the distributed computing environment according to the QUBO data structure; and
   execute the mixture-of-experts model using the plurality of hardware components according to the assignment.

2. The system of claim 1, wherein the set of attributes of the plurality of hardware components comprises at least one of an amount of memory, a memory bandwidth, a processing capability, or a number of processing circuits.

3. The system of claim 1, wherein the one or more processors are further configured to:
   determine the set of co-activation metrics for the plurality of experts by causing the mixture-of-experts model to process a predetermined dataset.

4. The system of claim 1, wherein the one or more processors are further configured to:
   generate a set of assignments for the plurality of experts by solving a cost function generated using the QUBO data structure.

5. The system of claim 4, wherein the one or more processors are further configured to:
   select an optimization function from a plurality of optimization functions applicable to the cost function; and
   generate the set of assignments by applying the optimization function to the cost function.

6. The system of claim 1, wherein the one or more processors are further configured to:
   generate a second set of co-activation metrics based on execution of the plurality of experts assigned to the plurality of hardware components;
   determine, based on the second set of co-activation metrics, that the plurality of experts are to be re-assigned among the plurality of hardware components; and
   generate a second QUBO data structure according to the second set of co-activation metrics in response to determining that the plurality of experts are to be re-assigned.

7. The system of claim 1, wherein the one or more processors are further configured to:
receive a request to deploy the mixture-of-experts model in the distributed computing environment; and
identify the plurality of hardware components based on the request.

8. The system of claim 1, wherein the one or more processors are further configured to:
update the set of co-activation metrics according to at least one threshold.

9. The system of claim 1, wherein the one or more processors are further configured to:
generate the QUBO data structure further based on a number of parameters in each expert of the plurality of experts.

10. The system of claim 1, wherein a subset of the plurality of experts comprise replica networks, and wherein the one or more processors are further configured to:
generate the QUBO data structure further based on at least one penalty term for placement of the subset of the plurality of experts among the plurality of hardware components.

11. A method, comprising:
obtaining, by one or more processors coupled to non-transitory memory, a set of attributes of a plurality of hardware components of a distributed computing environment;
determining, by the one or more processors, a set of co-activation metrics for a plurality of experts of a mixture-of-experts model according to inference or training operations executed using the mixture-of-experts model;
generating, by the one or more processors, a quadratic unconstrained binary optimization (QUBO) data structure based at least on the set of attributes and the set of co-activation metrics;
assigning, by the one or more processors, the plurality of experts of the mixture-of-experts model to the plurality of hardware components of the distributed computing environment according to the QUBO data structure; and
executing, by the one or more processors, the mixture-of-experts model using the plurality of hardware components according to the assignment.

12. The method of claim 11, wherein the set of attributes of the plurality of hardware components comprises at least one of an amount of memory, a memory bandwidth, a processing capability, or a number of processing circuits.

13. The method of claim 11, further comprising determining, by the one or more processors, the set of co-activation metrics for the plurality of experts by causing the mixture-of-experts model to process a predetermined dataset.

14. The method of claim 11, further comprising generating, by the one or more processors, a set of assignments for the plurality of experts by solving a cost function generated using the QUBO data structure.

15. The method of claim 14, further comprising:
selecting, by the one or more processors, an optimization function from a plurality of optimization functions applicable to the cost function; and
generating, by the one or more processors, the set of assignments by applying the optimization function to the cost function.

16. The method of claim 11, further comprising:
generating, by the one or more processors, a second set of co-activation metrics based on execution of the plurality of experts assigned to the plurality of hardware components;
determining, by the one or more processors, based on the second set of co-activation metrics, that the plurality of experts are to be re-assigned among the plurality of hardware components; and
generating, by the one or more processors, a second QUBO data structure according to the second set of co-activation metrics in response to determining that the plurality of experts are to be re-assigned.

17. The method of claim 11, further comprising:
receiving, by the one or more processors, a request to deploy the mixture-of-experts model in the distributed computing environment; and
identifying, by the one or more processors, the plurality of hardware components based on the request.

18. The method of claim 11, further comprising updating, by the one or more processors, the set of co-activation metrics according to at least one threshold.

19. The method of claim 11, further comprising generating, by the one or more processors, the QUBO data structure further based on a number of parameters in each expert of the plurality of experts.

20. The method of claim 11, wherein a subset of the plurality of experts comprise replica networks, and further comprising:
generating, by the one or more processors, the QUBO data structure further based on at least one penalty term for placement of the subset of the plurality of experts among the plurality of hardware components.

* * * * *